United States Patent [19]

Schenck et al.

[11] 4,188,119
[45] Feb. 12, 1980

[54] TWO-COORDINATE LENGTH MEASURING DEVICE FOR MICROSCOPIC INSTRUMENTS

[75] Inventors: Karl-Wilhelm Schenck, Hermannstein; Gunthard Nissel, Wetzlar; Erich Schuster, Hüttenberg, all of Fed. Rep. of Germany

[73] Assignee: Ernst Leitz Wetzlar GmbH, Wetzlar, Fed. Rep. of Germany

[21] Appl. No.: 878,340

[22] Filed: Feb. 16, 1978

[30] Foreign Application Priority Data

Feb. 24, 1977 [DE] Fed. Rep. of Germany ....... 2707960

[51] Int. Cl.² .......................................... G02B 27/36
[52] U.S. Cl. .................................... 356/252; 33/165; 350/10
[58] Field of Search ......................... 350/10; 356/252; 33/162, 165, 166

[56] References Cited

U.S. PATENT DOCUMENTS

| 2,085,380 | 6/1937 | Muller | 33/165 |
|---|---|---|---|
| 2,329,828 | 9/1943 | Clark | 33/162 |
| 3,046,666 | 7/1962 | Mesich | 33/165 |
| 3,406,457 | 10/1968 | Poulin | 33/162 |
| 3,846,008 | 11/1974 | Sobajima et al. | 350/10 |

*Primary Examiner*—John K. Corbin
*Assistant Examiner*—R. A. Rosenberger
*Attorney, Agent, or Firm*—Schwartz, Jeffery, Schwaab, Mack, Blumenthal & Koch

[57] ABSTRACT

Disclosed is a two-coordinate measuring device for use in the measuring ocular of a microscopic measuring instrument, comprising at least one reference mark carrier movably mounted in an intermediate image plane of the instrument and having a direction of movement which forms an angle of 45° with axes in the x- and y-direction defined by the object, and means mounted in the measuring ocular for adjusting the position of the mark carrier in order to align the reference mark with the dimensions of an object which is to be measured. The reference mark of the carrier preferably comprises two perpendicular lines which are arranged on the carrier such that the bisector of the angle formed by the lines coincides with the direction of movement of the carrier. Also disclosed is a process for use of this device.

6 Claims, 10 Drawing Figures

TWO-COORDINATE LENGTH MEASURING DEVICE FOR MICROSCOPIC INSTRUMENTS

BACKGROUND OF THE INVENTION

The present invention relates to two-coordinate length measuring devices for microscopic instruments, particularly microhardness and small load hardness-testers.

Microhardness testers in which measurements in two coordinates are possible and in which, for example, the length of both diagonals of a hardness impression can be determined, are known. With conventional apparatus for the measurement of the diagonals of an object, the measuring ocular is mounted in a rotatable manner. The reference mark or marks are also mounted so that they are displaceable in the direction of the diagonals of the impression. This is true both for marks which consist of straight lines or only a single straight line, and those that are constructed in the form of a 90° angle in order to accommodate the rectangular shape of the impression. In the measurements of the diagonals of the impression, the foregoing marks are moved into superposition with the edges or corners of the impression. While in the case of angular marks, the impression is "encompassed" and therefore emphasis is on area measurements, the devices of the type utilizing straight lines as marks insure exact superposition on the corners and thus better determinations of length. However, in apparatus using either type of mark, as mentioned above, following the measurement of one of the diagonals, rotation of the ocular containing the mark by 90° is necessary in order to determine the length of the second diagonal.

SUMMARY OF THE INVENTION

Accordingly, it is an object of the present invention to provide a two-coordinate length measuring device for use with microscopic instruments which simplifies the measurement process and thus shortens the time necessary for measurement.

It is an additional object of the instant invention to provide a two-coordinate length measuring device of the above-described type which has a simplified design and consequently a lower cost of production.

A further object of the instant invention is the provision of a measuring device of the foregoing type which possesses an improved reading and evaluation capacity.

A specific object of the present invention is to provide a two-coordinate length measuring device for use in the measuring ocular of a microscopic measuring instrument which eliminates the necessity of rotating the ocular in order to measure both diagonals of a rectangular object.

In accomplishing the foregoing and other objects, there has been provided in accordance with the present invention, a two-coordinate measuring device for use in the measuring ocular of a microscopic measuring instrument, comprising at least one reference mark carrier movably mounted in an intermediate image plane of the instrument and having a direction of movement which forms an angle of 45° with the object axes of the ocular; and means mounted in the ocular for adjusting the position of the mark carrier in order to align the reference mark with the dimensions of an object which is to be measured. In accordance with the present invention, the reference mark of the carrier preferably comprises two perpendicular lines which are arranged on the carrier such that the bisector of the angle formed by the lines coincides with the direction of movement of the carrier.

If only a single cross-hair is used, the gauge or reference mark preferably comprises a cross-hair having an angle bisector which coincides with the direction of movement of said carrier. Additional reference marks of the same type with fixed distances may also be provided in order to facilitate measurements. In order to measure the length of a diagonal, the object is first aligned so that its diagonals coincide with the object axes of the ocular. One leg of the mark is then placed on a corner of the object representing a zero position, and then the same leg of the mark is shifted to the opposite corner. For nearly rectangular objects, the diagonal (D) of the object is then given by the formula $D = M/\sqrt{2}$ where M is the amount of movement of the reference mark along its angle bisector. The other diagonal may then be measured, without the necessity of rotating the ocular, in the same manner but with the other leg of the mark.

Preferably, however, the measuring device comprises two reference mark carriers, since this eases the measurement process, as will become more apparent hereinafter. The two mark carriers may be adjustable together or separately. In a common adjustment arrangement, the adjustment means preferably comprises a pair of opposing wedges which engage both mark carriers. Alternatively, when the carriers are separately adjustable, micrometer screws, which may further be combined with a rapid setting device, may be employed. It is also desirable to provide zero setting marks for the carriers in which position the vertices of each reference mark coincides with the center of the object to be measured. In use, the object is first aligned so that its diagonals coincide with the object axes of the ocular. After zeroing, the mark carriers are then moved until the reference marks encompass one of the diagonals. For nearly rectangular objects, the diagonal (D) of the object is then given by the formula $D = M/\sqrt{2}$ where M is the distance between the vertices of the reference marks. The other diagonal may then be facilely measured by merely adjusting the reference marks to encompass the second diagonal and then measuring the distance between the vertices of the reference marks.

In a further embodiment of the instant invention, the mark carriers are designed as elements of a transducer which acts on a counter, and are connected to a digital display device and/or data processing installation.

Other objects, features, and advantages of the instant invention will become apparent to the skilled artisan upon examination of the following detailed description of the present invention, taken in conjunction with the figures of drawing.

DETAILED DESCRIPTION OF THE PREFERRED EMBODIMENT

The measuring device of the present invention eases the handling of microscopic measuring instruments, and thus shortens the time required for the measurement operation. In addition, by providing a simplified design, the cost of the device is reduced, and through other supplemental measures the reading and evaluation capacity of the microscopic measuring devices is improved. It is proposed in accordance with the instant invention to provide at least one reference mark carrier as means for aligning the reference mark on the object, the carrier being arrangeed in an intermediate image plane of the instrument and mounted movably in a holder, such that its path of motion forms an angle of 45° with the object axes (x and y coordinaates). The reference marks preferably comprise two line marks perpendicular to each other, with the bisector of the angle of the mark coinciding with the direction of the path of motion.

If only a single mark carrier is used, the reference mark conveniently comprises a cross-hair or two 90° angles crossing each other. Additional auxiliary marks of the same type with fixed distance may also be provided, in order to facilitate measurements. For measuring the diagonals of an object, one leg of the mark must be first placed on a corner of the hardness impression, and after alignment in this zero position, the same leg or an auxiliary mark coordinated with it must be shifted to the opposite corner. The other diagonal is measured in the same manner but with the other leg of the mark.

The measurement process is significantly eased by providing two mark carriers, each of which are in the form of 90° angles opposing each other. They may be adjustable together or separately. In a common adjustment arrangement, it is convenient to use a drive element comprising opposing wedges which act on both mark carriers to displace them in the required direction.

For impressions with a nearly rectangular configuration, the diagonal (D) of the impression can be determined by the formula:

$$D = M/\sqrt{2}$$

where (M) is the measuring path given by the distance between the vertices of the angles of the marks superimposed on the corners of the impression imaged.

The reference mark carriers are conveniently designed as parts of a measuring ocular. Micrometer screws can therefore be used in a known manner as adjusting elements for the mark carriers. Such precision adjusting elements can also be combined with a rapid displacement device. In addition, to further facilitate the measuring process it is convenient to provide zero setting marks for the two mark carriers.

In a further development of the inventive concepts of the invention, the mark carriers are designed as elements (scale; reference gauge mark) of a transducer. The latter can be made to act on a counter, which may be connected to a data processing installation and/or a digital data display device.

Figure 1:
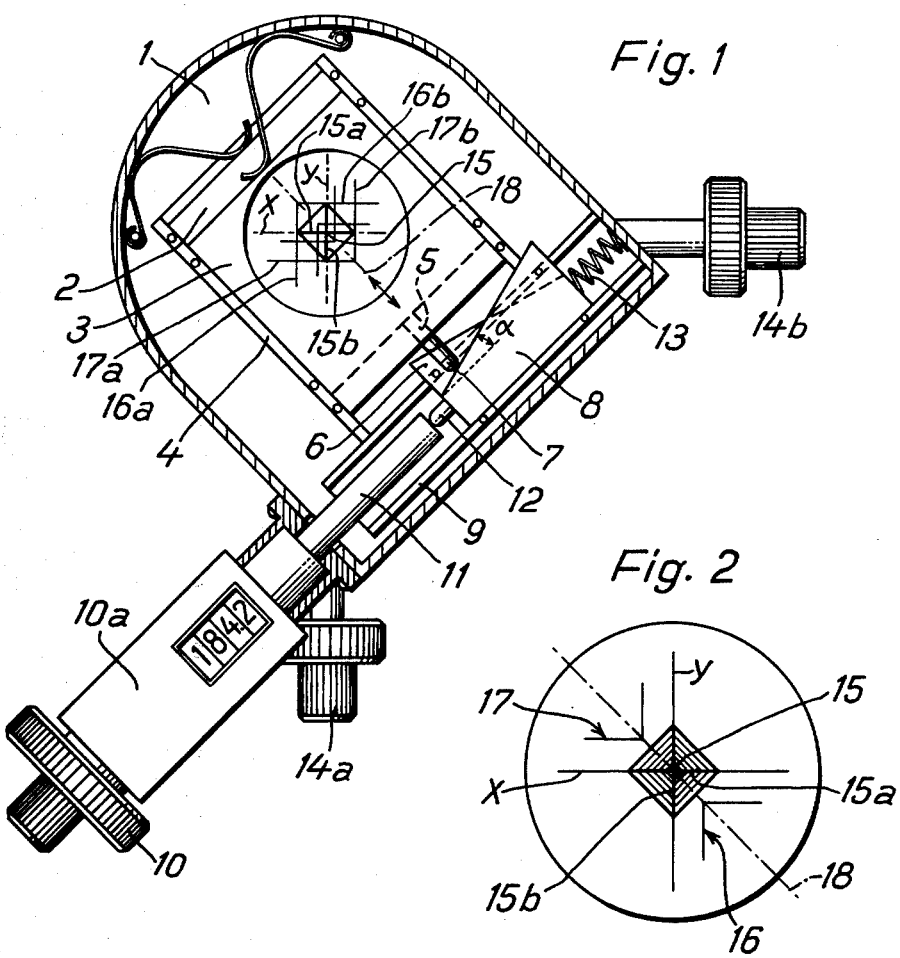
FIG. 1 illustrates a cross-section of a hardness measuring ocular utilizing the device of the present invention with reference marks adjustable in opposing directions.

Referring to FIG. 1, in the housing 1 of the hardness measuring ocular the two mark carriers 2 and 3, under spring action, are mounted displaceably in the direction of the track 4. The mark carrier 2 has a tracer pin 5 which cooperates with the wedge 6. A similar tracer pin 7 on mark carrier 3 engages the wedge 8. The wedges are interconnected and can be displaced together in the guide 9 of the housing 1. The measuring screw 10 serves as the adjusting means; the screw 10 terminates in a bolt 11 which engages the shoulder 12 of the double wedge. A spring 13 biases the double wedge into a position corresponding to the zero position of the carriers. A measuring transducer 10a with a numerical display is connected with the measuring screw. Centering screws 14a, 14b, are also provided so that the measuring arrangement can be centered on the hardness impression designated 15. Suitably, the angle of inclination of $\alpha$ of the wedges is chosen so that the tangent of the angle $\alpha$ is $\sqrt{2}/2$, to enable the direct reading of the measuring path on the transducer 10a.

Figures 2, 3, 4:
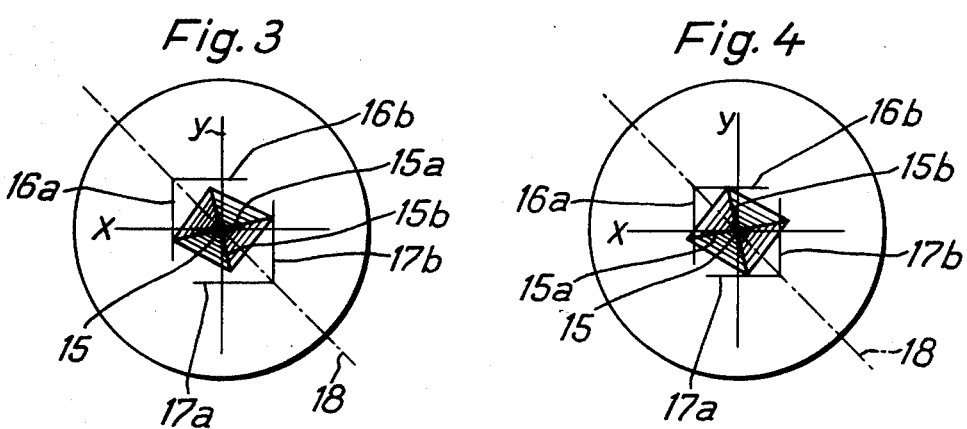
FIG. 2 illustrates the image field in the initial position.
FIG. 3 shows the image field in position to measure one diagonal.
FIG. 4 illustrates the image field in position to measure the other diagonal.

The two diagonals 15a, 15b, of the impression are aligned so that they run in the direction of the x and y coordinates which correspond to the two axes of the object (FIG. 2). The mark carrier 2 contains the reference mark 16, which is in the shape of a 90° angle with the legs 16a, 16b. The opposite reference mark 17 of the mark carrier 3 also is in the shape of 90° angle with the legs 17a, 17b. The angle bisector 18 of the two marks coincides with the track 4 which is inclined by 45° with respect to the two x-y coordinates.

The measuring process of the device is as follows:

Following the rough setting of the entire device of the ocular at the center of the hardness impression 15 by the centering elements 14a, 14b, the two opposing legs 16a, 17b are set on the corners of the diagonal 15 by operating the measuring screw 10 (FIG. 3).

The length D of the diagonal can then be read on the digital display of the transducer and corresponds to the formula:

$$D = M/\sqrt{2}$$

where M is the distance between the vertices of the two reference marks 16 and 17.

Next, the ends of the diagonal 15b are to be defined between the legs 16b and 17a (FIG. 4). If the hardness impression has a square or nearly square shape, one measuring step generally suffices; in this case, the angle marks are applied to all corners simultaneously.

Figure 5:
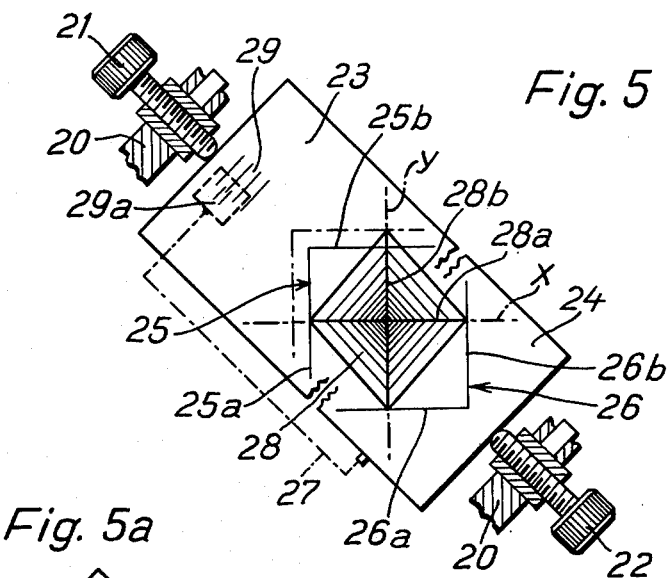
FIG. 5 illustrates an arrangement of mark carriers displaceable independently of each other.
Figure 6:
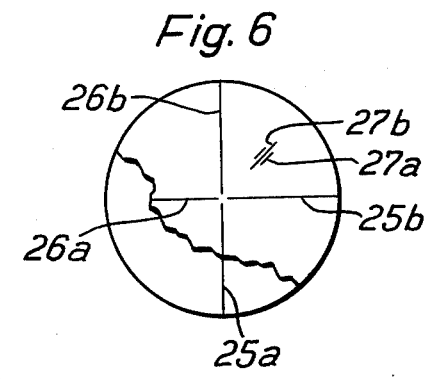
FIG. 6 shows the image field in zero position.

FIG. 5 illustrates another embodiment of the present invention in which the measurement operation is even more improved. Here, two drive screws 21, 22 are mounted in the housing 20, each of them acting on a mark carrier 23, 24. The screws 21, 22 are independent of each other, but are adjustable at an angle of 45° with respect to the x and y coordinates, as in the preceding example. The mark carrier 23 carries the reference mark 25 with its legs 25a and 25b, and the carrier 24 carries the reference mark 26 with its legs 26a and 26b. Both of the reference marks are in the shape of a 90° angle and are oriented oppositely to each other. To facilitate the setting of the zero position of both setting drives, so-called zero marks 27a, 27b are coordinated with the mark carriers (FIG. 6).

Figure 5A:
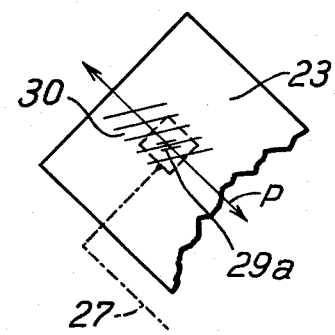
FIG. 5a shows one of the mark carriers according to FIG. 5, with an oblique matrix division.

In the preferred embodiment, the mark carrier 23, as shown by the dash-dot line 27, is connected with the measuring standard (reference mark 29a), and the mark carrier 24 with matrix 29 of a measuring transducer. The lines of the matrix, as shown in FIG. 5a and there designated 30, can also be arranged obliquely so that the conversion factor √2 for the determination of the length is eliminated. The direction of the displacement of the mark carriers is indicated by the arrow P.

In this embodiment, the measuring process for a hardness impression 28, with its diagonals 28a, 28b in the direction of the x and y axes, is as follows:

First, the mark carriers are set in their initial position with the aid of the zero mark, and the counter is set to zero. The mark carriers 23 and 24 are then displaced by the way of the drive screws 21 and 22 so that the corners of the impression 28 corresponding to the diagonal 28a are encompassed between the legs 25a and 26b. The magnitude of the measuring path can then be read directly on the counter 30.

In the same manner, the diagonal 28b is measured, but without the necessity of rotating the ocular. Without re-setting to the initial position, it is merely necessary to place the legs 25b, 26a at the corners of the impression corresponding to the diagonal 28b. The magnitude of the measuring path (diagonal 28b) can then be read on the counter.

Figure 7:
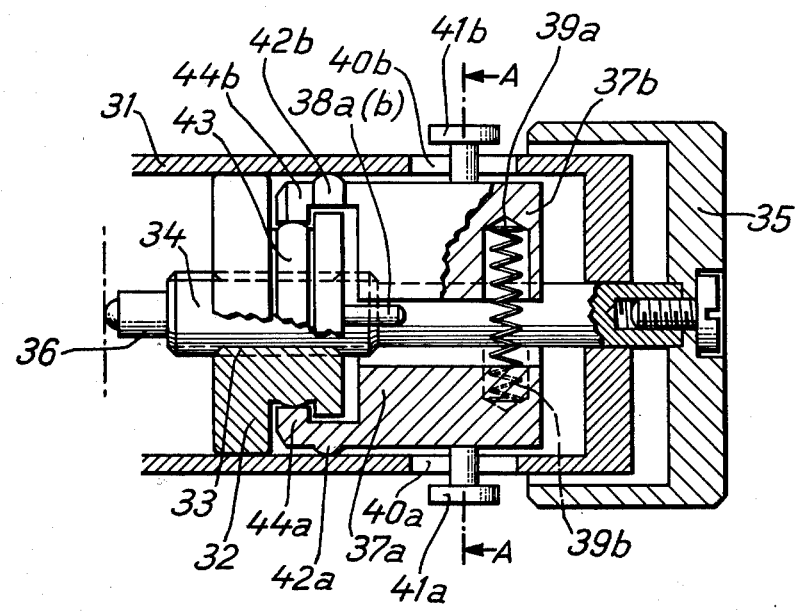
FIG. 7 is an expanded embodiment of the drive according to FIG. 5 with a rapid adjusting device, in longitudinal section.
Figure 8:
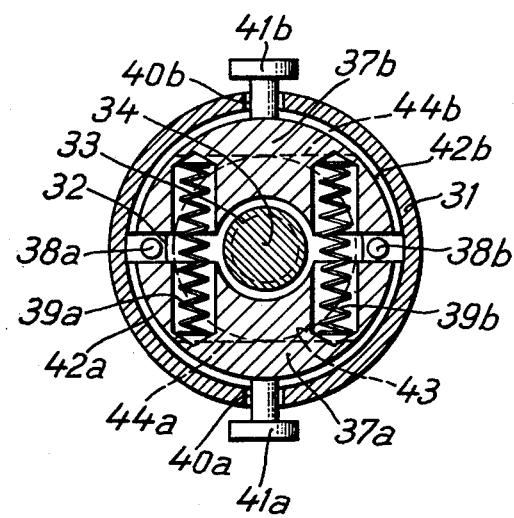
FIG. 8 is a cross-section along line A—A of FIG. 7.

As shown in FIG. 7, a rapid setting device is used for displacement of the mark carriers in place of the simple drive screws. This device comprises the solidly mounted cylinder 32 in which nut 32 slides. A threaded bolt 34 engages the thread of the nut 33, the bolt carrying on one end a knurled knob 35, the other end being designed as a press pin 36. The latter acts upon the reference mark carriers. Two clamping segments are provided, designated 37a, 37b, which also slide in the cylinder 31. The segments 37a, 37b are securd against rotation by the pins 38a, 38b extending from the nut 32.

The clamping segments are biased apart by two springs 39a and 39b, which spread them in a direction towards the cylinder 31. An activating button 41a, 41b is associated with each segment, extending through the holes 40a, 40b, in the cylinder 31. In addition, the segments have beads 42a, 42b which serve as bearing points for establishing frictional engagement with the cylinder 31 and have external diameters which are coordinated with the internal diameter of the cylinder. Further, the segments rest with their shoulders 44a, 44b on the ring piece 43 of the nut 32.

Operation of the rapid setting devices is as follows:

Pressure on the activating buttons 41a, 41b disengages the beads 42a, 42b, dissolving the connection between the housing cylinder 31 and the clamping segments. The threaded bolt 34 can now be displaced axially with the nut 32, in the cylinder 31. Following the release of the buttons 41a, 41b, fine setting can be achieved. For this, the knurled button 35 must be rotated. Under the action of the springs 39a, 39b the beads 42a, 42b of the clamping segments press against the cylinder and establish frictional locks between the cylinder 31, and also between the ring segments 43 and the shoulders 44a, 44b. The pressure between the shoulders 44a, 44b and the ring segment 43 is sufficient to lock the nut 32 in the position it occupies following the rapid setting. By operating the knurled button, the threaded bolt can then be finely adjusted with respect to the nut.

Figure 9:
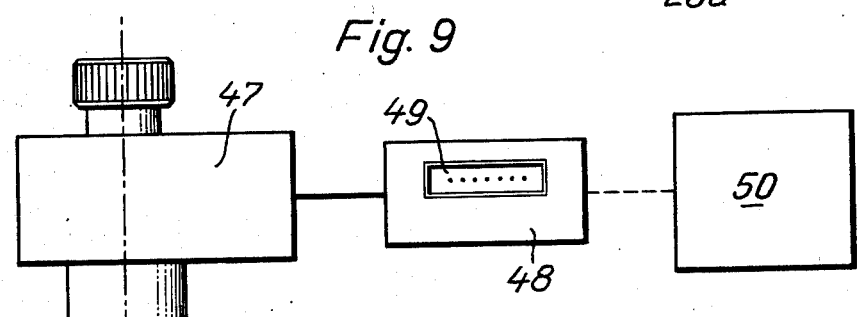
FIG. 9 is a schematic representation of a hardness measuring ocular, utilizing the instant device, connected to an evaluating device.

FIG. 9 illustrates a further embodiment of the instant invention, representing schematically the connection of an evaluation means to the device. The transducer 48 is directly connected with the hardness measuring ocular 47 and contains a digital display unit 49. A data processing device 50 may also be connected with the unit.

What is claimed is:

1. A two-coordinate measuring device for use in the measuring ocular of a microscopic measuring instrument for measuring the dimensions of an object, said object having object axes (x and y coordinates), comprising:
   (a) two reference mark carriers, mounted movably with respect to each other in an intemediate image plane of said instrument, said reference mark carriers having the same path of movement and having a direction of movement which forms an angle of 45° with the object axes, said carriers each having a reference mark thereon, each reference mark comprising two perpendicular lines forming a 90° angle, with the two angles being oriented in opposite directions, such that the bisector of the angle of each of said reference marks coincides with the direction of movement of said carrier; and
   (b) means mounted in said measuring ocular for separately adjusting the position of each of said mark carriers in order to align said reference marks with the dimensions of said object, said object, said adjustment means comprising a pair of independently operable drive screws, mounted in said ocular at an angle of 45° with respect to the object axes, which engage said carriers, and means for the rapid setting of said drive screws, said rapid setting means comprising:
   (i) a cylinder solidly mounted on said ocular having a pair of oppositely disposed longitudinal holes therein;
   (ii) a circular nut which is slidable within said cylinder, and has a threaded central bore whose threads engage said drive screw, and at the end opposite said ocular, a pair of pins extending therefrom, said nut comprising an end section with a diameter corresponding to the internal diameter of said cylinder, an opposite end section of reduced diameter, and a ring section intermediate said end sections of smallest diameter;
   (iii) a pair of semi-circular clamping segments having a diameter corresponding to the internal diameter of said cylinder, each of said clamping segments having an activating button mounted exteriorly thereon which extends through the longitudinal holes in said cylinder, a shoulder portion which engages said nut and rests in said nut ring section, a bead on the outer surface thereof, a semi-circular depression on the interior surface thereof for passage of said drive screw, and a pair of transverse bores; and
   (iv) a pair of springs which are seated in the corresponding transverse bores of said clamping segments which bias said segments apart.

2. The device of claim 1, wherein said reference mark carriers have further zero marks thereon for aligning said carriers in a zero position.

3. The device of claim 2, further comprising a measuring transducer which is connected to each of said reference mark carriers.

4. The device of claim 3, wherein one of said reference mark carriers has lines thereon which form the measuring standard of said transducer, and the other carrier has lines thereon which form the matrix of said transducer.

5. The device of claim 4, further comprising a digital display unit and a data processing device connected to said transducer.

6. The device of claim 1, wherein said instrument is a microhardness or small load hardness-testing instrument.

* * * * *